United States Patent [19]

Wax

[11] 4,057,040
[45] Nov. 8, 1977

[54] INTERNAL COMBUSTION ENGINE SYSTEM

[76] Inventor: Archie E. Wax, Kingston Springs, Tenn.

[21] Appl. No.: 675,710

[22] Filed: Apr. 12, 1976

[51] Int. Cl.² .......................... F02B 75/32; F02G 3/00
[52] U.S. Cl. .................................... 123/46 R; 60/616; 123/197 A; 123/197 AC
[58] Field of Search ............ 123/46 R, 76, 197, 90.12, 123/90.13; 60/614, 616, 618

[56] References Cited

U.S. PATENT DOCUMENTS

| | | | |
|---|---|---|---|
| 367,496 | 8/1887 | Atkinson | 123/197 AC |
| 3,145,660 | 8/1964 | Bush | 123/46 R X |
| 3,180,078 | 4/1965 | Liston | 60/616 |
| 3,533,429 | 10/1970 | Shoulders | 123/46 R X |

Primary Examiner—Carroll B. Dority Jr.
Assistant Examiner—Craig R. Feinberg
Attorney, Agent, or Firm—Harrington A. Lackey

[57] ABSTRACT

A four-cycle internal combustion engine having a transmission linkage between the engine piston and the power output enabling the power stroke of the engine piston to be substantially greater than the intake stroke. The preferred form of transmission linkage comprises a hydraulic circuit including a ram fixed to the engine piston and a pair of branch hydraulic lines including displacement pistons timed to produce the lengthened power stroke.

Preferably, a Stirling-type engine is connected to the output and utilizes the waste heat from the internal combustion engine to improve the efficiency of the system.

Another feature of the internal combustion engine system is the utilization of a unique, timed, sleeve valve mechanism for controlling the intake and exhaust ports.

16 Claims, 24 Drawing Figures

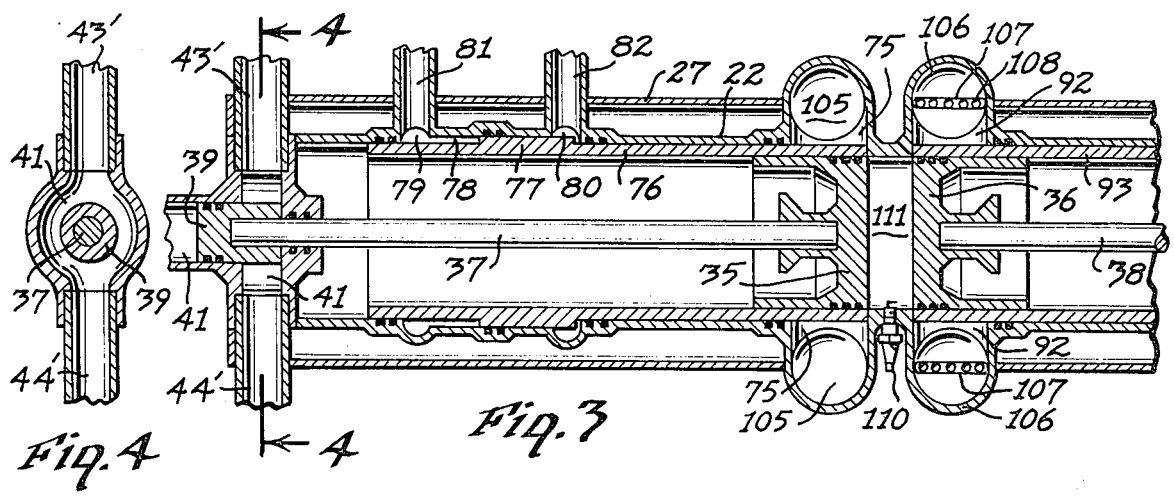
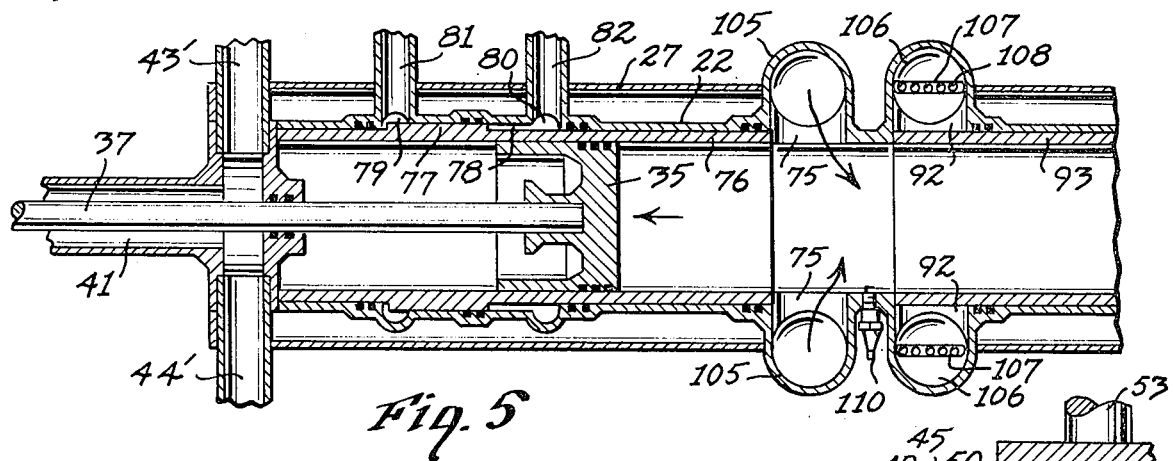
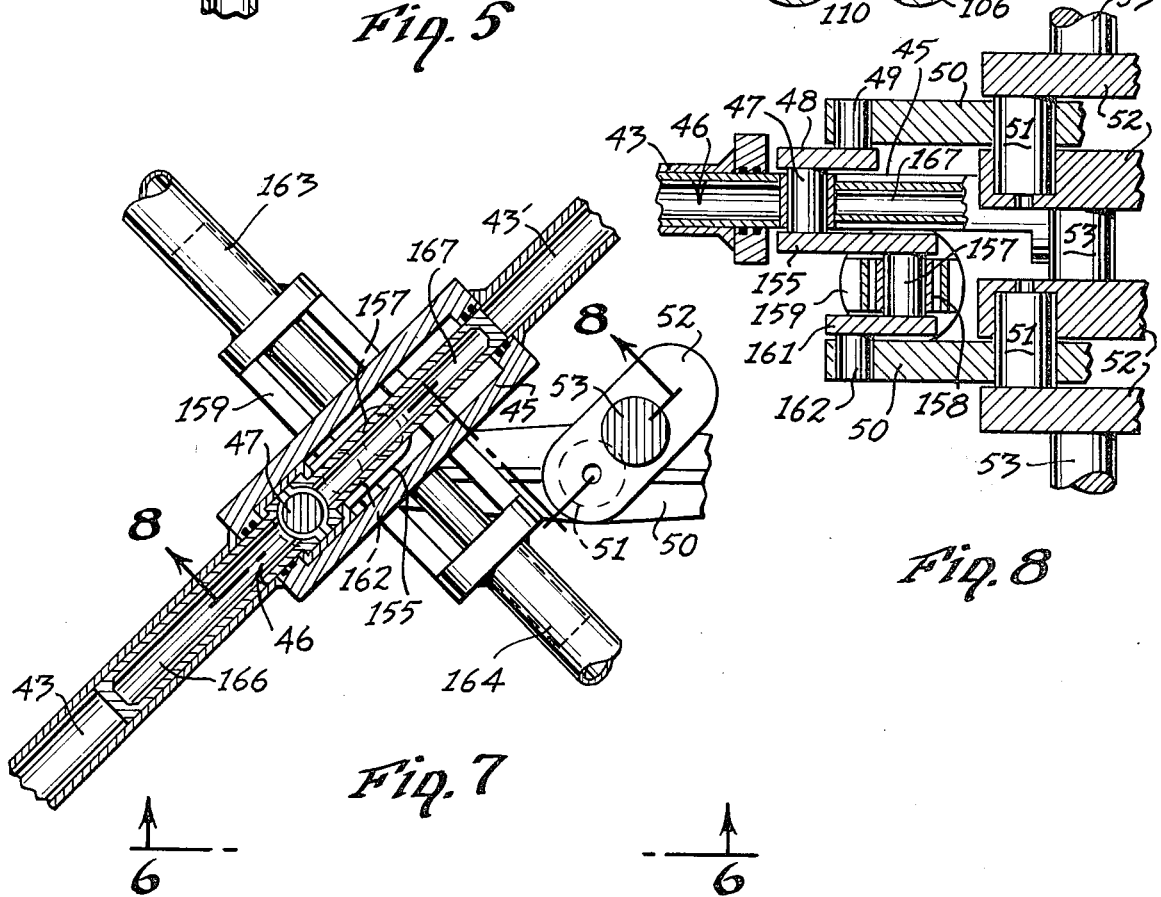

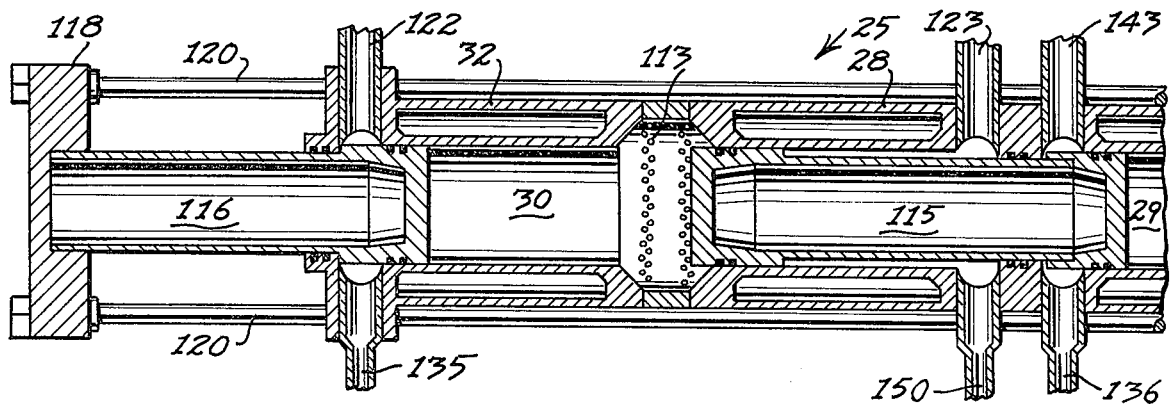
Fig. 9
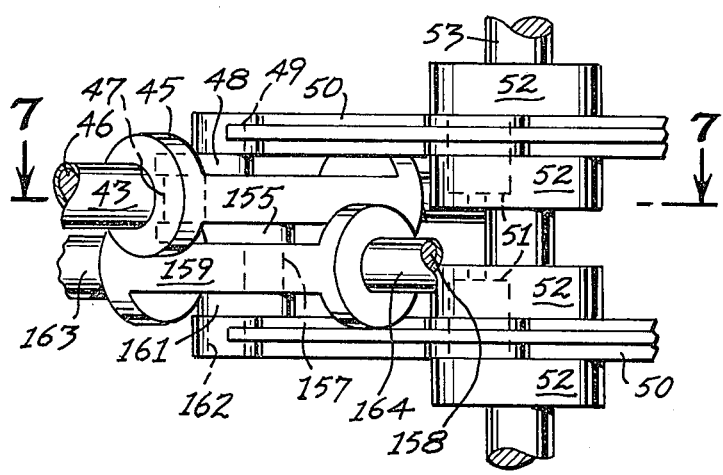
Fig. 6
| FIRING ORDER OF CYLINDERS | POSITION OF DISPLACEMENT CRANKS | | ENGINE PISTON POSITION |
|---|---|---|---|
| | FAST SIDE | SLOW SIDE | |
| ① | 0° | 0° | END OF POWER STROKE. |
| ⑥ | 450° | 225° | MIDDLE OF INTAKE STROKE. |
| ③ | 180° | 90° | END OF COMPRESSION STROKE. |
| ⑧ | 630° | 315° | MIDDLE OF EXHAUST STROKE. |
| ④ | 270° | 135° | MIDDLE OF COMPRESSION STROKE. |
| ⑦ | 540° | 270° | END OF EXHAUST STROKE. |
| ② | 90° | 45° | MIDDLE OF POWER STROKE. |
| ⑤ | 360° | 180° | END OF INTAKE STROKE. |
Fig. 16

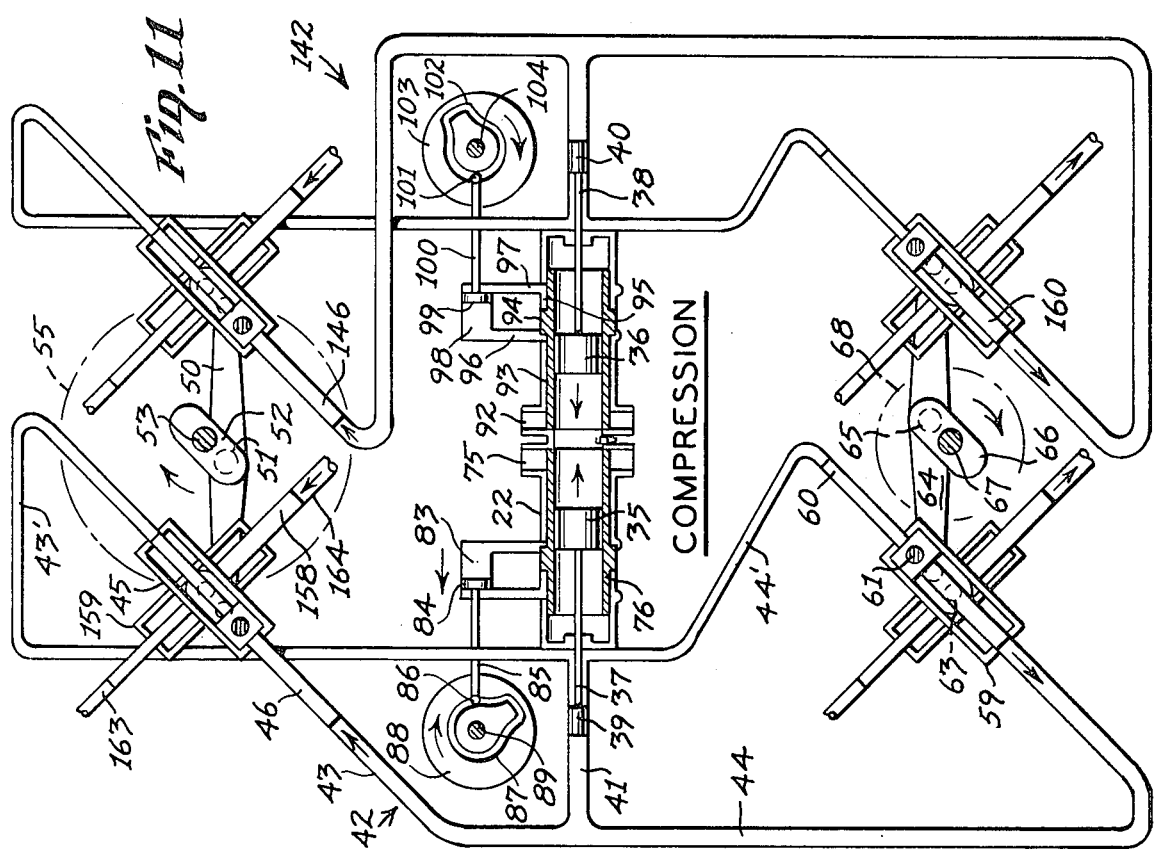
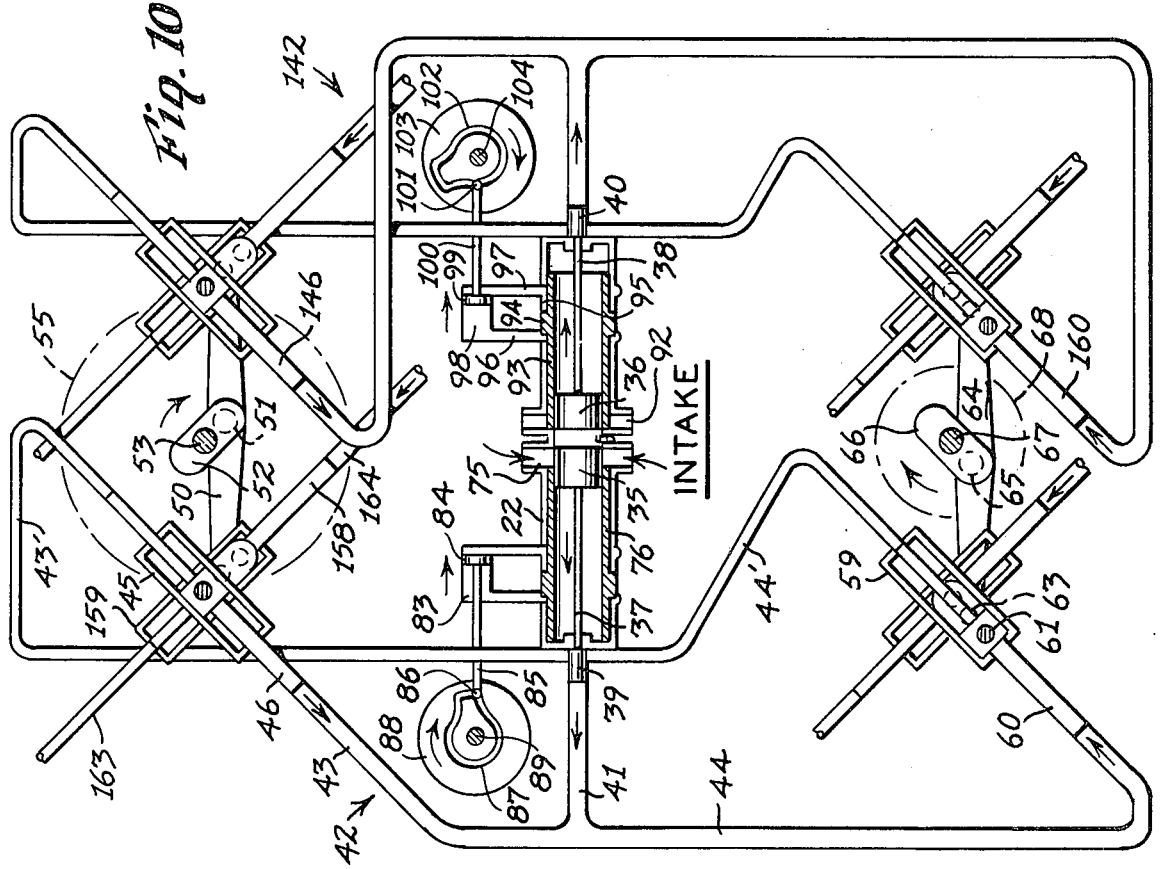

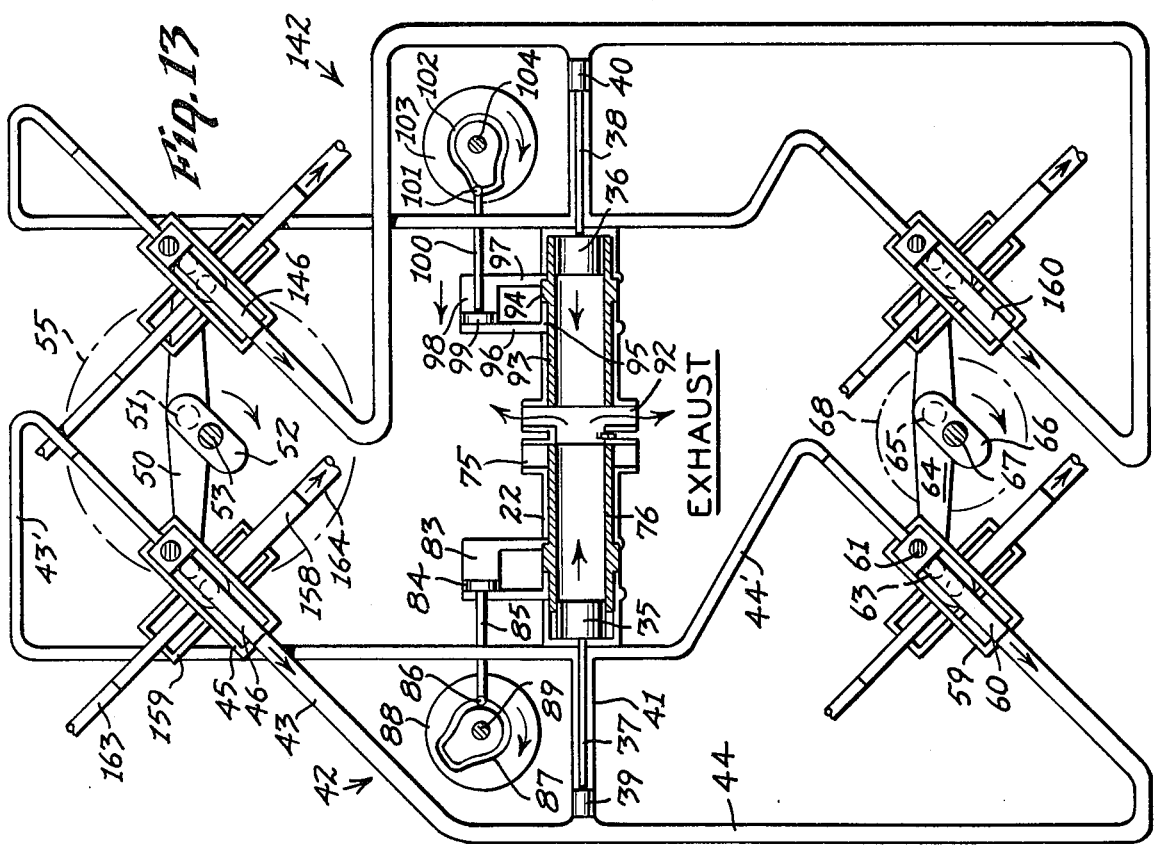
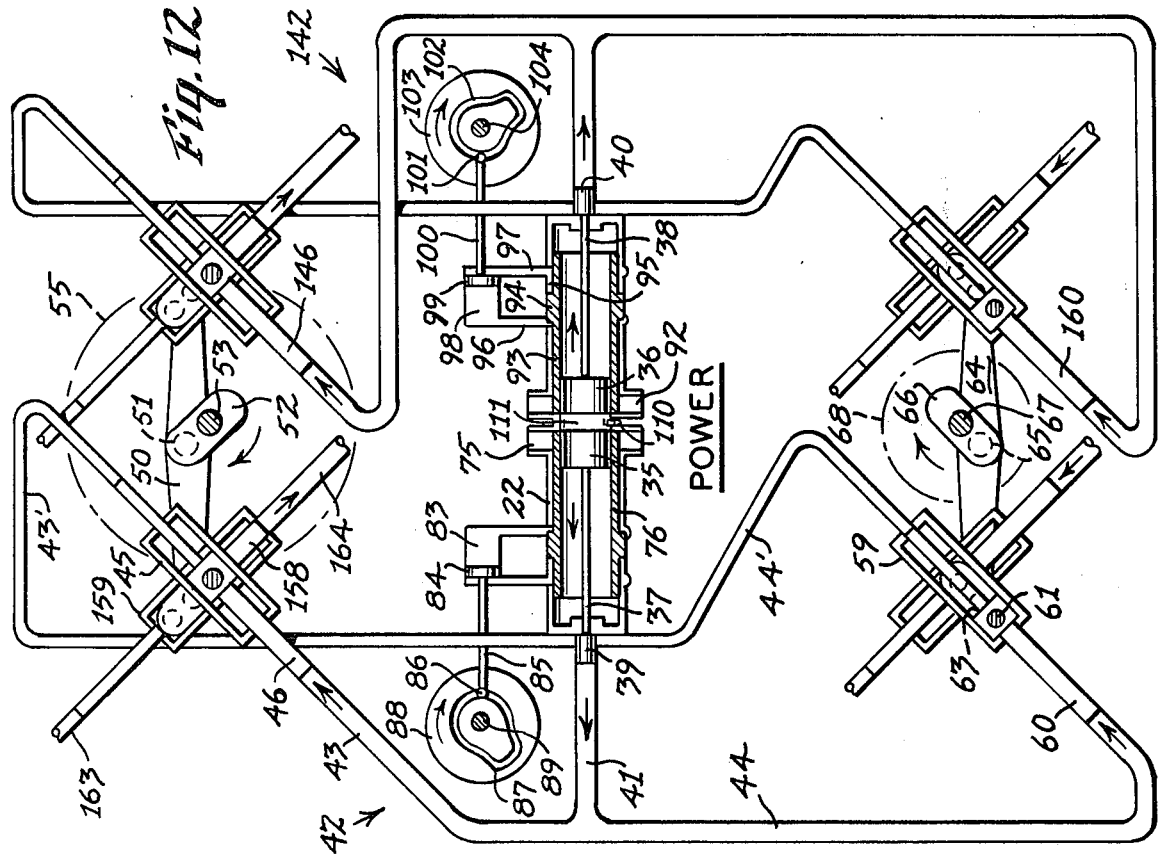

INTERNAL COMBUSTION ENGINE SYSTEM

BACKGROUND OF THE INVENTION

This invention relates to an internal combustion engine system, and more particularly to an internal combustion engine having a lengthened power stroke.

Conventional four-cycle internal combustion engines include an engine piston within a cylinder which has substantially equal intake and power strokes.

Although most conventional internal combustion engines include a single engine piston with a cylinder, nevertheless counter-piston engines including two pistons reciprocating in opposite directions within a single cylinder are known, as disclosed in the following U.S. patents:

| | | |
|---|---|---|
| 1,699,111 | Lyons | Jan. 15, 1929 |
| 2,977,943 | Lieberherr | Apr. 4, 1961 |
| 3,525,215 | Conrad | Aug. 25, 1970 |
| 3,847,124 | Kramer | Nov. 12, 1974 |

However, all of the pistons in the counter-piston engines disclosed in the above patents have intake and power strokes of substantially equal lengths.

The Conrad patent also discloses a ram associated with each piston connected through a hydraulic fluid circuit to a rotary displacement piston, in turn connected to an output shaft for the engine.

SUMMARY OF THE INVENTION

It is therefore an object of this invention to provide a four-cycle internal combustion engine system, preferably of the counter-piston type, in which each engine piston is operatively connected through a transmission linkage system to an output means, including timing means for producing a power stroke of substantially greater length than the intake stroke.

In the preferred form of the invention, the transmission linkage is in the form of a hydraulic circuit including a ram passage in which a ram reciprocably travels, which is operatively connected to the engine piston for concurrent reciprocal movement. A pair of loop branch lines are connected in parallel to opposite ends of the ram passage. A displacement piston reciprocates within each branch line. Each displacement piston is linked through means, such as a crank mechanism, to an output system including reduction gear transmission and an output shaft, for transmitting the power from the internal combustion engine cylinder to the output system, and simultaneously to control the length of the piston stroke so that the power stroke is substantially greater than the intake stroke.

The lengthened power stroke utilizes more of the energy of the expanding combustion gases, and utilizes the energy more rapidly, since the time period for the power stroke is substantially the same as the time period for the intake stroke, causing the engine piston to move more rapidly during the power stroke than the intake stroke.

The efficiency of the engine is also improved by the utilization of two pistons reciprocating in opposite directions within a single cylinder utilizing a higher ratio of piston working face to the cylinder wall, reducing heat loss of the system and utilizing more of the available energy for moving the two pistons.

The internal combustion engine system preferably includes a Stirling-type engine, including hot and cold compartments, within which reciprocate hot and cold pistons separated by regenerator means and operatively connected to the same power output means as the internal combustion cylinder. The hot compartment is coupled to the internal combustion engine cylinder wall through an appropriate heat exchanger means or conduit to heat the walls of the hot compartment with the waste heat from the internal combustion cylinder.

The system further includes a sleeve valve reciprocable axially of the internal combustion cylinder for opening and closing the intake port, and another sleeve valve for opening and closing the exhaust port. By virtue of the sleeve valves, the exhaust and intake ports may be larger than usual and extend substantially the entire circumference of the cylinder wall for admitting a greater volume of combustible fluids through the intake port and for discharging a greater volume of exhaust fluids through the exhaust port in less time. The sleeve valves are preferably controlled by valve actuator mechanisms in timed relationship with the strokes of the engine, such as a rotary cam valve actuator operatively connected to the output means.

The transmission means between the Stirling-type engine cylinder and the power output means is also preferably a hydraulic circuit including power and displacement pistons linked to the cold and hot compartments of the Stirling cylinder in a predetermined manner.

BRIEF DESCRIPTION OF THE DRAWINGS

FIG. 3 is an enlarged fragmentary section taken along the line 3—3 of FIG. 2;

FIG. 4 is a fragmentary section taken along the line 4—4 of FIG. 3;

FIG. 5 is a view similar to FIG. 3, showing the engine pistons and sleeve valves in an alternate position;

FIG. 6 is an enlarged, fragmentary end elevation, taken along the line 6—6 of FIG. 7, illustrating the cruciform arrangement of a pair of displacement pistons and their crank linkage;

FIG. 7 is a fragmentary section taken along the line 7—7 of FIG. 6;

FIG. 8 is a fragmentary section taken along the line 8—8 of FIG. 7;

FIG. 9 is an enlarged, fragmentary section taken along the line 9—9 of FIG. 2;

FIG. 10 is a schematic diagram of one of the power cylinders and its hydraulic transmission circuitry and crank linkage, illustrating the engine pistons at the beginning of the intake stroke;

FIG. 11 is a schematic view similar to FIG. 10, illustrating the engine pistons at the beginning of their compression stroke;

FIG. 12 is a schematic view similar to FIG. 10, illustrating the engine pistons at the beginning of their power stroke;

FIG. 13 is a schematic view similar to FIG. 10, illustrating the engine pistons at the beginning of their exhaust stroke;

FIG. 16 is a table illustrating the firing order of the engine cylinders and the relative positions of the engine pistons and the displacement piston cranks;

DESCRIPTION OF THE PREFERRED EMBODIMENT

Figure 1:
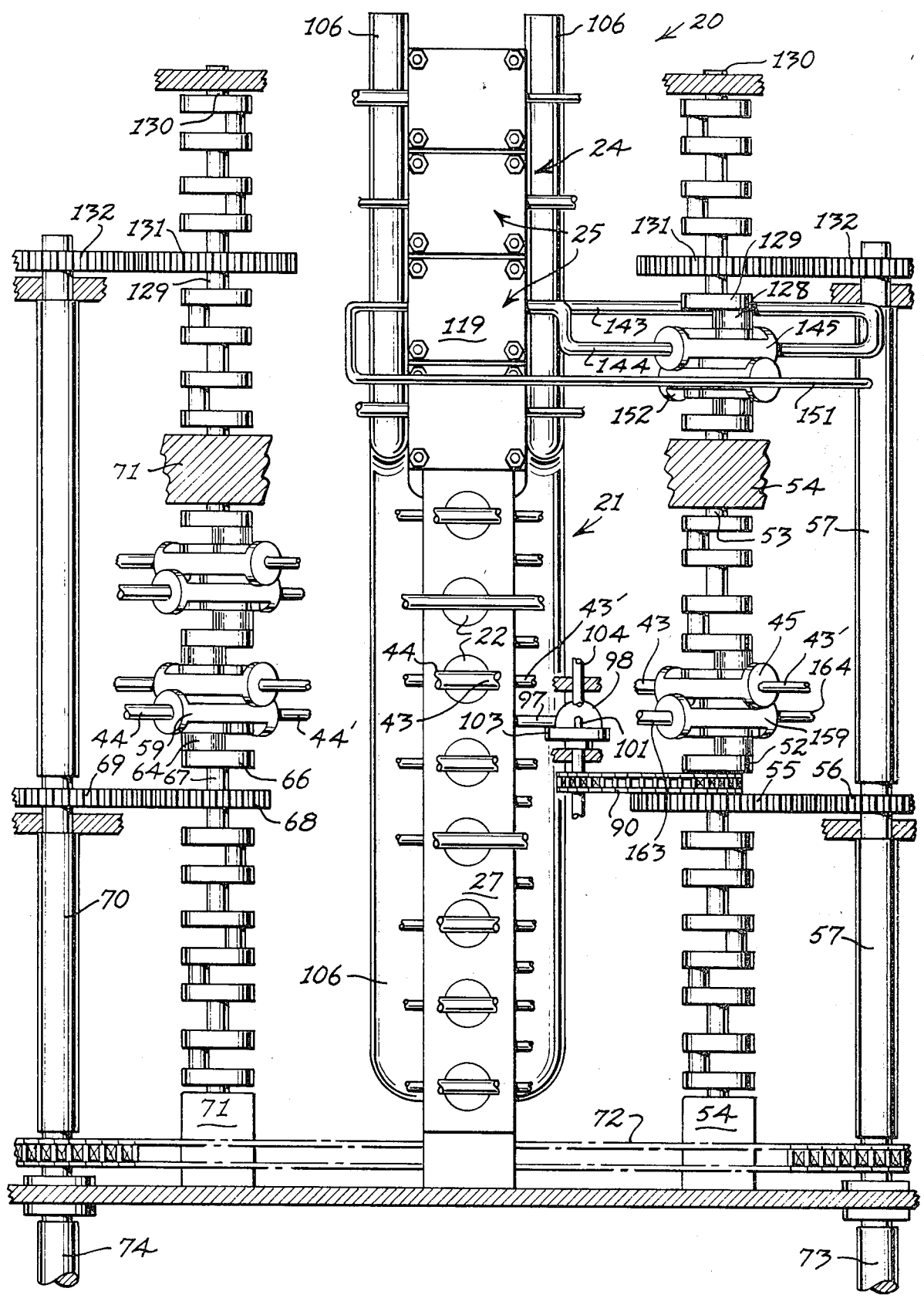
FIG. 1 is an end elevation of the internal combustion engine system made in accordance with this invention, with portions broken away for clarity.
Figure 2:
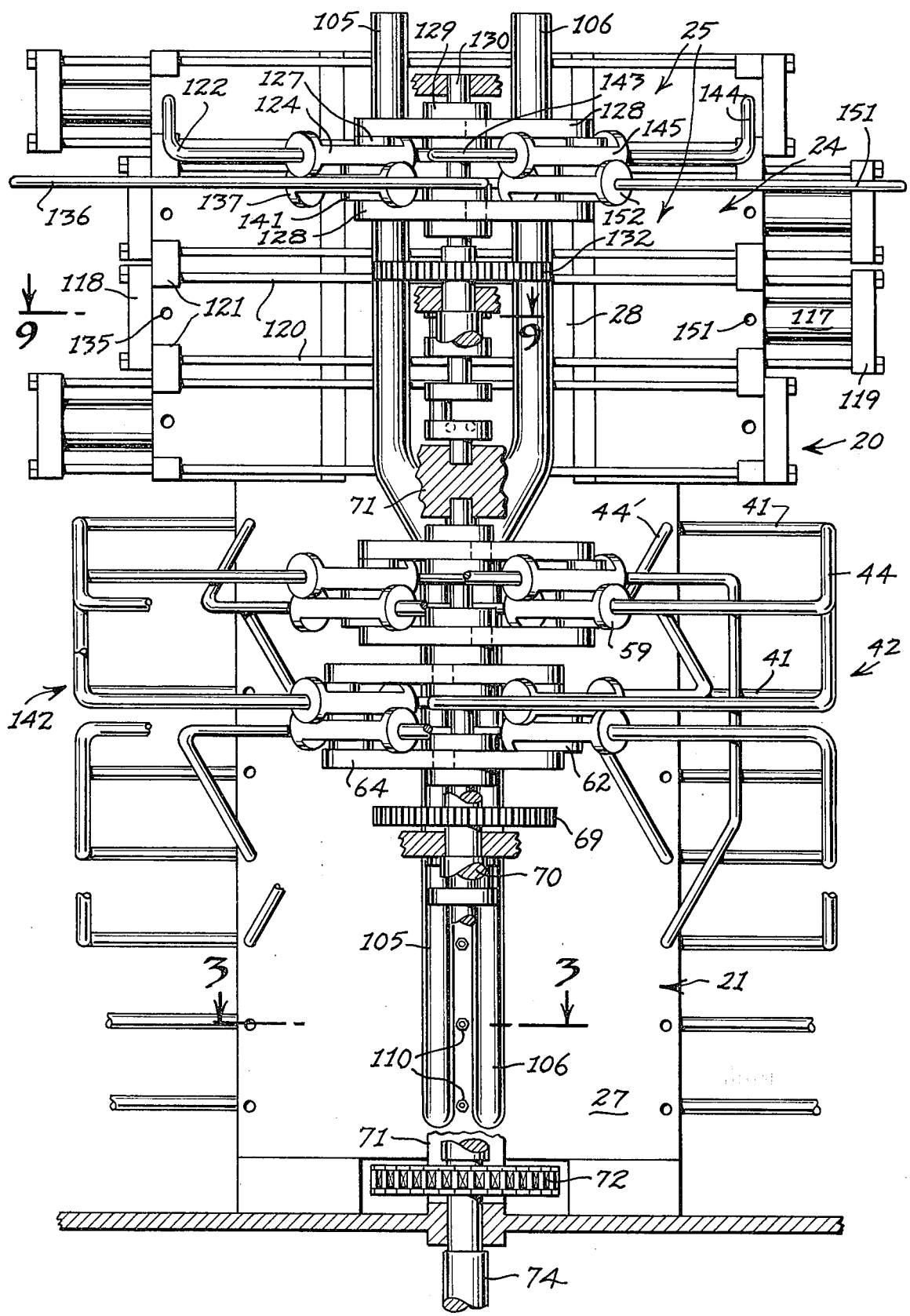
FIG. 2 is a side elevation of the system disclosed in FIG. 1, with portions broken away.

Referring now to the drawings in more detail, FIGS. 1 and 2 disclose the internal combustion engine apparatus or system 20 including a bank 21 of eight vertically spaced, horizontally disposed, internal combustion engine cylinders 22.

Mounted above the bank 21 of internal combustion engines is a bank or stack 24 of four Stirling-type engines 25.

Figure 14:
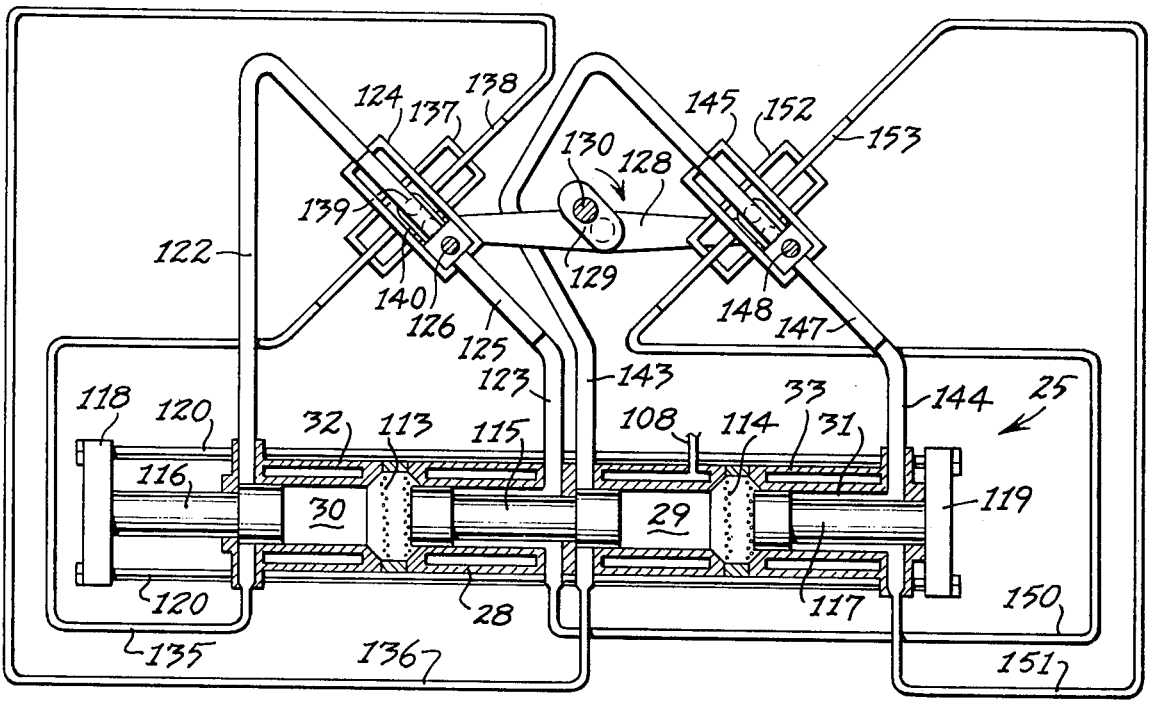
FIG. 14 is a schematic view of one of the Stirling engine cylinders, its hydraulic transmission and crank linkage, illustrating the hot pistons and cold pistons in one operative position.
Figure 15:
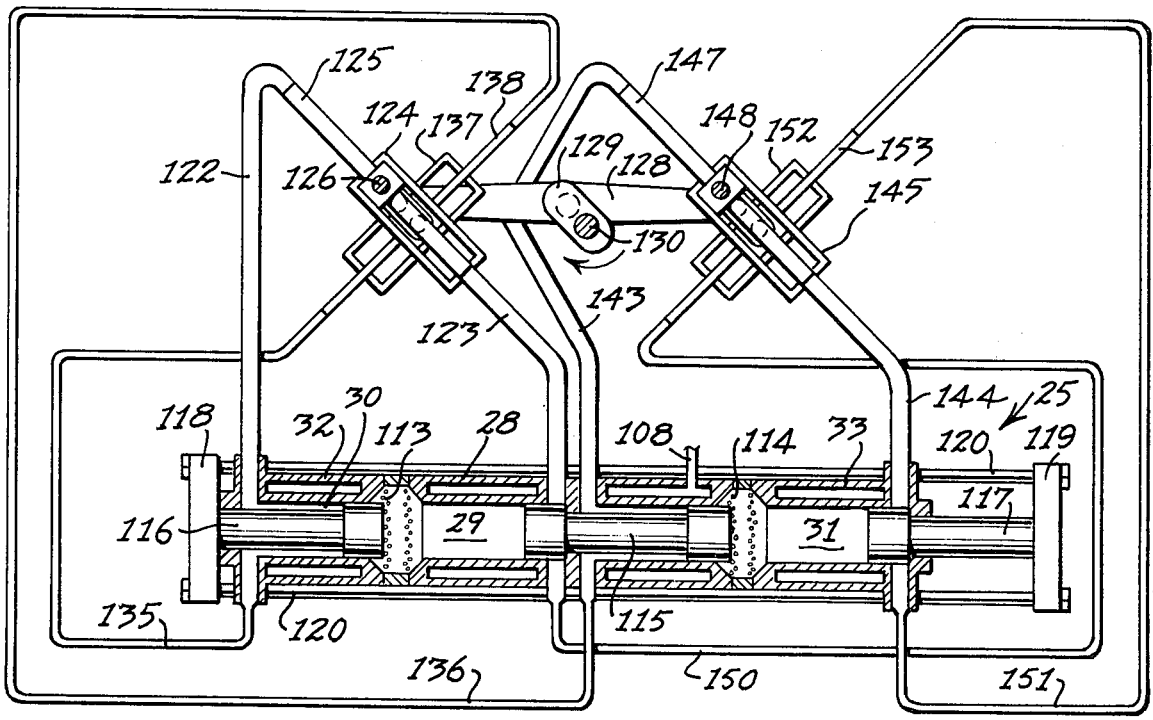
FIG. 15 is a schematic view similar to FIG. 14, illustrating the hot pistons and cold pistons at their opposite extreme positions from FIG. 14.

The internal combustion cylinders 22 are housed in a water jacket 27 adapted to cool the cylinders 22. The internal combustion engine water jacket 27 is in communication with a hot water jacket 28 surrounding the hot compartments or chambers 29 (FIG. 9) of the Stirling engine 25. The cold chambers 30 and 31 of the Stirling engines 25 are encased by the cold water jackets 32 and 33 (FIGS. 9, 14 and 15). Preferably, the jacket 27 containing the cooling water for the internal combustion engine 22 is in communication with the hot water jacket 28 of the Stirling engine, so that waste heat from the internal combustion engines is transferred to the hot water jacket 28 for utilization of the transferred heat by the hot compartment or chamber 29.

Referring now to FIGS. 3-5 and 10-13, each internal combustion engine cylinder 22 includes a pair of oppositely reciprocable engine pistons 35 and 36. Each piston 35 and 36 is fixed to a corresponding piston rod 37 and 38, to the opposite end of each of which is fixed a ram 39 and 40, respectively. The ram 39 is adapted to reciprocate within a hydraulic line or ram passage 41 forming part of a hydraulic transmission circuit 42. The opposite end of the ram passage 41 from the cylinder 22 divides into a pair of branch lines 43 and 44. The branch line 43 terminates in a piston track 45 within which longitudinally and reciprocably slides a displacement piston 46. The displacement piston 46 moves reciprocably within the branch line 43. The opposite end of the reciprocal displacement piston 46 is adapted to move within another section of the branch line 43', which is fixed at one end to the piston track 45, while its opposite end communicates with the ram passage 41 adjacent the cylinder 22, as best disclosed in FIGS. 3 and 4.

A pin 47 is journaled in the displacement piston 46 and connected to one end of a drive crank arm 48. The other end of the drive crank arm 48 is connected by a pin 49 to link bar 50, which is in turn connected by wrist pin 51 to driven crank arm 52 fixed to rotary transmission shaft 53 (FIGS. 6-8). The rotary transmission shaft 53 is journaled in bearings 54, as best disclosed in FIG. 1, and coupled through gears 55 and 56 to an output shaft 57.

Referring back to FIGS. 10-13, the other branch line 44 terminates in another piston track 59 reciprocably supporting the displacement piston 60. One end of the displacement piston 60 reciprocates in the remote end of the branch line 44, while the opposite end of the displacement piston 60 reciprocably moves in one end of the branch line section 44', also attached to the opposite end of the piston track 59. The other end of the branch line section 44' is coupled to the ram passage 41 at the same axial location, but opposing the connection of the branch line 43', as best disclosed in FIGS. 3 and 4.

The displacement piston 60 is also provided with a pin 61, which is connected to a drive crank arm 62, identical to crank arm 48, and disclosed in FIG. 2. Drive crank arm 62 is connected by pin 63 (FIG. 10) to one end of the connecting link bar 64. The connecting bar 64 is in turn journaled upon wrist pin 65 connected to driven crank arm 66, in turn fixed to the driven transmission shaft 67. The transmission shaft 67 is supported in bearings 71 on the opposite side of the bank of cylinders 21 from the transmission shaft 53. The transmission shaft 67 is coupled through gears 68 and 69 to output shaft 70. The output shafts 57 and 70 may be linked through a sprocket and chain transmission 72, if desired, and power may be taken off of either of the power output shafts 73 or 74 (FIG. 1).

It will be noted in FIG. 1 that the gear 55 is twice as large as the gear 56. Therefore, the transmission shaft 53 is traveling at half the rotary speed of the transmission shaft 67. Thus, the transmission shaft 53 and all the elements driving it will be considered as the "slow" elements in the system 20, whereas the transmission shaft 67 and all of its connecting elements will be referred to as the "fast" elements or "fast side" of the system 20.

The ram 40 of the other engine piston 36 functions in the same manner as the ram 39, in a separate but identical hydraulic transmission circuit 142, to operate a slow displacement piston 146 and a fast displacement piston 160, which are crank-connected to the opposite ends of the corresponding connecting bars 50 and 64 in order to drive the transmission shafts 53 and 67.

Relatively large intake ports 75 are formed near the middle of the internal combustion engine cylinder 22 and adjacent the piston 35 in its extreme, retracted position prior to the intake stroke, as best disclosed in FIG. 10.

Slidably and coaxially received within the cylinder 22, and in turn slidably receiving the piston 35 is an intake sleeve valve 76. The intake sleeve valve 76 is provided with an annular piston ridge 77 (FIGS. 3 and 5) adapted to reciprocate within a fluid passage 78 terminating at opposite ends in ports 79 and 80. The ports 79 and 80 are connected by fluid conduits 81 and 82, respectively, to an actuator chamber 83 (FIGS. 10-13) reciprocably receiving the actuator piston 84. The piston 84 is linked through rod 85 to a cam follower 86 which is positively controlled and driven in a cam track 87 on the rotary cam 88, mounted on rotary cam shaft 89. The cam shaft 89 is driven through a transmission, similar to chain and sprocket transmission 90 (FIG. 1), from the slow transmission shaft 53.

In a similar manner, exhaust ports 92 are adapted to be opened and closed by an exhaust sleeve valve 93 reciprocably and coaxially slidable within the cylinder wall 22 and adapted to slidably receive the engine piston 36. The structure of the exhaust sleeve valve 93 is the mirror image of the intake sleeve valve 76, including a piston ridge 94 (FIGS. 10–13) adapted to reciprocate within the piston chamber 95, the opposite ends of which are connected by fluid conduits 96 and 97 to an actuator chamber 98. The reciprocable actuator piston 99 within chamber 98 is connected by rod 100 to cam follower 101, which is positively driven and controlled in cam track 102 within the cam 103 on rotary cam shaft 104. The cam shaft 104 is in turn driven in timed relationship with the slow transmission shaft 53 through the sprocket and chain transmission 90, as disclosed in FIG. 1.

As disclosed in FIGS. 10–13, the intake sleeve valve 76 is timed through the cam 88 to open the intake port 75, positively and quickly, at the beginning of the intake stroke (FIG. 10), and to close the intake port 75 at the end of the intake stroke (FIG. 11). For the remainder of the cyclical strokes of the pistons 35 and 36, the intake sleeve valve 76 is held tightly closed by the positive action of the cam 88.

In a similar manner, the exhaust sleeve 93 is positively opened at the beginning of, and closed at the end of, the exhaust stroke of the pistons 35 and 36, as best disclosed in FIG. 13.

FIG. 3 discloses the engine pistons 35 and 36 at the ends of their exhaust strokes and just prior to commencing their intake strokes, with both sleeve valves 76 and 93 closed. FIG. 5 discloses the engine piston 35 nearly completing its intake stroke with the intake sleeve valve 76 open and the exhaust sleeve valve 93 closed.

The intake ports 75 communicate with an intake manifold 105 extending up both sides of the engine banks 21 and 24, one side of which is disclosed in FIG. 2. The exhaust ports 92 communicate with exhaust manifold flues 106, also projecting up both sides of the engine banks 21 and 24, as best disclosed in FIGS. 1 and 2.

As best disclosed in FIGS. 3 and 5, the waste heat from the exhaust gases are partially recovered in heat exchangers 107, which may be constructed in various forms, such as a plurality of water pipes, the water being transferred from the heat exchangers 107 through a hot water conduit 108 into the hot water jacket 28, as disclosed in FIGS. 14 and 15.

A spark plug 110 may be mounted in the internal combustion engine cylinder wall 22 between an intake port 75 and an exhaust port 92, to introduce a spark into a combustion chamber 111 between the faces of the engine pistons 35 and 36 (FIG. 3).

Fuel may be injected at the appropriate time and in the appropriate location in the intake manifold in order to introduce the proper mixture of fuel and air through the intake ports.

With reference to FIGS. 9, 14 and 15, the Stirling-type engines 25 are adapted to function in accordance with the principle of conventional Stirling engines. The engines 25 include an elongated cylinder in which the hot chamber 29 is in the middle and separated from the end cold chambers 30 and 31 by regenerators 113 and 114. A hot piston 115 is adapted to reciprocate within the hot chamber 29 between the regenerators 113 and 114. A pair of cold pistons 116 and 117 are fixed to heads 118 and 119, which are in turn fixed to each other by external slide rods 120 movable in slide bearings 121. Thus, the cold pistons 116 and 117 move simultaneously and reciprocably within their respective cold chambers 30 and 31 toward and away from the respective regenerators 113 and 114.

The cold water jackets 32 and 33 may be supplied with cold water at room or tap temperature, or they may be supplied with cold water from a refrigerated system, not shown, in order to increase the efficiency of the engine 25.

The cold chamber 30 and the hot chamber 29 are connected by displacement fluid lines 122 and 123, respectively, to piston track 124, reciprocably slidably receiving displacement piston 125 for alternate movements in the opposite ends of the displacement lines 122 and 123. The displacement piston 125 is provided with a pin 126 connected to a drive crank arm 127 (FIG. 2), which in turn is connected to connecting link bar 128 journaled to driven crank arm 129 fixed to the transmission shaft 130. The transmission shaft 130 is coupled to the output shaft 79 through the gears 131 and 132.

Power branch lines 135 and 136 connect the cold chamber 30 and the hot chamber 29, respectively, to opposite ends of piston track 137 slidably supporting power piston 138 for reciprocal movement within the adjacent ends of the fluid lines 135 and 136. The power piston 138 is connected by a rotary pin 139 through link bar 140 to rotary pin 126 on displacement piston 125. The pin 139 is also connected through a drive crank arm 141 to a parallel connecting bar 128, which is also coupled through another driven crank arm 129 to transmission shaft 130. In this manner, the displacement piston 125 and the power piston 138 reciprocate in a cruciform arrangement in timed relation with each other.

The cold chamber 31 and hot chamber 29 are connected to one end of the displacement fluid lines 143 and 144, respectively. The opposite ends of the fluid lines 143 and 144 are connected to opposite ends of the displacement piston track 145, slidably receiving displacement piston 147 adapted to reciprocate alternately in opposite ends of fluid lines 143 and 144. The displacement piston 147 is connected by pin 148 through a crank mechanism identical to that connected with the pin 126 to the connecting bar 128 for driving the same transmission shaft 130.

Also, the power fluid lines 150 and 151 from the hot chamber 29 and the cold chamber 31, respectively, are connected to opposite ends of the track 152 reciprocably and slidably supporting the power piston 153 for reciprocal alternate movement in the opposite ends of the lines 150 and 151. The power piston 153 is connected by crank mechanism to the displacement piston 147 and the connecting bar 128 in the identical manner as the power piston 138 is connected to the displacement piston 125, for driving the transmission shaft 130 is timed relationship with the displacement piston 147.

As disclosed in FIG. 1, identical arrangement of the linked cruciform piston tracks 145 and 152, as well as the piston tracks 124 and 137, may be located on the opposite side of the Stirling engine bank 24 for transmitting energy from another Stirling engine 25 to the output shaft 57.

Referring again to FIGS. 6, 7, 8 and 10, it will be noted that the pin 47 in the displacement piston 46 is connected on its opposite end to one end of the link bar 155. The opposite end of the link bar 155 is connected to a similar pin 157 journaled in another displacement piston 158 reciprocably slidable within a piston track 159. The piston track 159 is located at substantially right angles to the piston track 45. The other end of the pin 157 is connected to another drive crank arm 161 connected by pin 162 to another connecting bar 50 parallel to the first bar 50 and connected by a similar wrist pin 51 to a pair of driven crank arms 52 which are also fixed to sections of the transmission shaft 53. The displacement piston 158 is adapted to reciprocate within the opposed ends of fluid branch lines 163 and 164. The branch lines 163 and 164 may form branch lines in another hydraulic system such as 42 or 142 associated with another internal combustion engine cylinder, such as one of the other cylinders 22 disclosed in the bank of eight cylinders 21. Thus, the displacement pistons 158 and 46 are linked in timed relationship to the link bar 155 and their respective drive crank arms 48 and 161 to effect circular motion to the pins 49 and 162, and to the corresponding ends of the connecting bars 50.

It will be noted in FIGS. 7 and 10 that the branch line 43 has a larger diameter than the branch line 43'. Also, the displacement piston 46 has an enlarged section 166 of a diameter equal to the inner diameter of the conduit 43 and a smaller section 167 having a diameter equal to the inner diameter of the branch line 43'. The reason that the lines 43 and 44 are larger than their corresponding branch lines 43' and 44' can best be illustrated in FIGS. 10 and 11. In FIG. 10, the ram 39 is the only body occupying the ram passage 41 in its retracted position. However, in FIG. 11, both the ram 39 and an increasing length of the piston rod 37 occupy the ram passage 41. Thus, the piston rod 37 displaces a certain amount of hydraulic fluid within the ram passage 41 behind the ram 39, and this is compensated for by the reduction in diameter of the branch lines 43' and 44', which are in communication with each other, but whose communication with the ram passage 41 is blocked by the ram 39.

Because a portion of the intake sleeve valve 76 and the exhaust sleeve valve 93 covering their respective ports 75 and 92 are exposed to the burning gases, without benefit of a cooling medium, such as the water within the water jacket 27, these sleeve valves must be made thicker than would normally be required, for structural strength and to dissipate the heat without deterioration or damage to the sleeve valves.

The positive action of the cams 88 and 103, the cam followers 86 and 101 and the actuator pistons 84 and 99, as well as the pressure of the hydraulic fluid within the actuator chambers and conduits against the piston ridges 77 and 94, provides strong holding and locking action of the respective sleeve valves in closing their respective intake and exhaust ports 75 and 92. The design of the cam tracks 87 and 102 is also adapted to provide quick closing and opening movements of the sleeve valves relative to their respective ports 75 and 92.

In the operation of this invention, reference will be made to the various cycles of one of the internal combustion cylinders 22 as disclosed sequentially in FIGS. 10, 11, 12 and 13.

In FIG. 10, the pistons 35 and 36 have just completed their exhaust strokes and are commencing their intake strokes to project outward the rams 39 and 40 in their ram passages 41. As the intake stroke begins, the intake sleeve valve 76 opens to permit the intake of the combustible fluid through the intake ports 75. The exhaust valve sleeve 93 tightly closes the exhaust ports 92.

Considering only the hydraulic circuit 42 in FIG. 10, the slow displacement piston 46 is in its intermediate, midway or central position moving in the direction of the arrow, that is toward the ram passage 41, or toward the face of the ram 39. At the same time, the fast displacement piston 60 is in its left extreme position commencing movement toward the right as indicated by the arrow in FIG. 10. Accordingly, as the ram 39 moves toward the left, the slow displacement piston 46 moves toward the left and the fast displacement piston 60 moves toward the right, hydraulic fluid moves in the direction of the arrows within the respective passages 41, 43 and 44 as disclosed in FIG. 10. In other words, hydraulic fluid in the line 43 is moving in opposition to the hydraulic fluid in the ram passage 41, but the flows of hydraulic fluid in both lines 43 and 41 converge and move through the branch line 44 in the same direction as the moving displacement piston 60. Because of this movement, hydraulic fluid in the branch line 44' is moved more rapidly into the ram passage 41 behind the ram 39, and to such an extent that the excess fluid from branch line 44' moves not only behind the ram 39 but also into the passage 43' behind the slow displacement piston 46.

At the end of the intake stroke of the piston 35 as disclosed in FIG. 11, the engine piston 35 has only moved about half way outward in the cylinder 22, in which position it stops, reverses, and begins its return compression stroke in the direction of the arrow disclosed in FIG. 11. Simultaneously, the slow displacement piston 46 has moved from its mid-position to its extreme left position at which point it too reverses direction and moves back toward the right. On the other hand, the fast displacement piston 60 has moved from its extreme left position to its extreme right position as disclosed in FIG. 11, in which position it begins its reverse movement toward the left. Thus, the direction of the hydraulic fluid in all of the passages 41, 43 and 44 have reversed, as disclosed by the arrows in FIG. 11, so that the faster moving displacement piston 60 is moving fluid toward and into both the ram passage 41 and the branch line 43.

It will also be noted that the wrist pin 51 has only moved through an arc of 90° from its position in FIG. 10 at the commencement of the intake stroke to its position in FIG. 11 at the end of the intake stroke. However, the fast wrist pin 65 has moved twice as far through an arc of 180°. Thus, the ratio of the rotary elements on the fast side to those rotary elements on the slow side is two to one.

In FIG. 12, the engine piston 35 has returned to its original position disclosed in FIG. 10 after completing its compression stroke. In FIGS. 11 and 12, both the intake ports and the exhaust ports are closed by the respective sleeve valves 76 and 93. With the pistons 35 and 36 fully retracted again compressing the combustible fluid between them, the spark plug 110 is ignited to explode the combustible gases within the combustion chamber 111 to drive the pistons 35 and 36 away from each other through the cylinder 22. However, in FIG. 12, it will be noted that, although the direction of hydraulic fluid has changed in the ram passage 41 and the branch line 44, the direction of hydraulic fluid remains the same in branch line 43 to continue driving the slow displacement piston 46 through its mid-point and ultimately to its right extreme position. Thus, in FIG. 12, the hydraulic fluid moving outward in the direction of the arrow in the ram passage 41 continues to move, not only through the branch line 44, but also through the branch line 43, thereby permitting the ram 39 to move twice as far through the ram passage 41 as it did during the intake stroke of the piston 35. Thus, as disclosed in FIG. 13, the engine piston 35 travels outward through the cylinder 22 more than twice as far during its power stroke as it traveled during its intake stroke disclosed in FIG. 11.

As disclosed in FIG. 13, at the end of the power stroke the piston 35 reverses to commence its exhaust stroke. Simultaneously, the slow displacement piston 46 after reaching its right extreme position also reverses and commences its return travel toward the left, while the fast displacement piston 60, having reached its extreme right position reverses its move toward its extreme left position. Accordingly, the direction of fluid travel in the branch line 43 and 44 oppose and reinforce each other to drive the ram 39 back through its longer stroke until the piston 35 reaches its original retracted position disclosed in FIGS. 10 and 12.

Again, in FIG. 12, the wrist pin 51 has traveled through an arc of 90° from its position in FIG. 11, and subsequently through another arc of 90° to its position in FIG. 13. Simultaneously, the wrist pin 65 connected to the fast displacement piston 60 has moved through sequential arcs of 180° for each 90° of movement by the wrist pin 51. Thus, the transmission shaft 53 is also moving through rotary intervals of 90° while the transmission shaft 67 is moving through arcs of 180°, so that the transmission shaft 67 is rotating twice as fast as the transmission shaft 53.

In FIG. 13, as the pistons 35 and 36 commence their exhaust strokes, the cam 103 causes the exhaust sleeve valve 93 to open the exhaust port 92 to exhaust the spent gases from the cylinder 22 as the pistons 35 and 36 return to their original positions disclosed in FIG. 10.

The four cycles have now been completed and are then sequentially repeated.

The transmission shafts 53 and 67 are timed through the gears 55, 56, 68 and 69. It will be noted in FIG. 1 that the gear 55 fixed upon the slow transmission shaft is twice as large as the gear 56 with which gear 55 meshes in order to drive the output shaft 57 twice as fast as the transmission shaft 53. On the other hand, the gears 68 and 69 are of equal diameter so that the output shaft 70 has the same speed as the transmission shaft 67. Thus, the shafts 57 and 70 are rotating at the same speed and therefore may be coupled, if desired, by the chain and sprocket transmission 72 having a one-to-one ratio.

Since the engine piston 35 moves more than twice as far in its power stroke as it does during its intake stroke, it automatically moves more than twice as fast as it does during its intake stroke. A faster moving engine piston 35 during its power stroke has the advantage of relieving pressure and heat more quickly from the walls of the cylinder thereby operating cooler and more efficiently. Moreover, the doubling of the power stroke 35 over the intake stroke also provides for a more efficient utilization of the piston 35, since the mass of the piston 35 has to be moved only about half as far as the power stroke during the intake and compression strokes; or conversely, the more than doubling of the power stroke over the intake stroke produces more work from the combustible gases.

In a double-piston cylinder in which the pistons 35 and 36 move in opposite directions, no head or end wall opposing the pistons is required. Accordingly, the ratio of the combustion chamber wall area to the burning gas volume is greatly reduced, resulting in less heat lost to the engine components.

Although it is believed that the Stirling engines 25 are a unique design, nevertheless they still function in the conventional manner of Stirling engines. The reciprocating hot piston 115, in moving to the right in the hot chamber 29 from its position in FIG. 14 to its position in FIG. 15, pushes hot gases through the regenerator 114 which absorbs some of the heat from the hot gases to lower the temperature of the gases entering the cold chamber 31. Simultaneously, the cool gases in cold chamber 30 are pushed by the cold piston 116 through the regenerator 113 to absorb heat and increase the temperature passing from the cold chamber 30 to the hot chamber 29 on the left side of the hot piston 115. After the pistons 115, 116 and 117 reach their positions disclosed in FIG. 15, they are reversed and move the gases back through the regenerators 113 and 114.

As the pistons continue to reciprocate to move the fluids of different temperatures back and forth, the fluids are also moved through the respective branch lines 122, 123, 143, 144, 135, 136, 150 and 151, in order to linearly reciprocate the respective displacement pistons 125 and 147 and the power pistons 138 and 153. In this manner, power is transmitted by the fluids to the respective positions, which in turn are coupled by the previously described crank mechanisms to drive the transmission shaft 130 in a rotary direction at the same speed as the fast transmission shaft 67. Thus, in FIG. 1, the reduction gear transmission between each transmission shaft 130 and the respective output shafts 57 and 70 includes a gear 131 fixed to the transmission shaft 130 having the same diameter of its meshing gear 132 fixed to the respective output shafts 57 and 70.

As previously described, the cold chambers 30 and 31 are cooled by water jackets 32 and 33 containing water of ambient temperature, or refrigerated water. But the hot chamber 29 is heated by water in jacket 28 from two sources. One source is the water within the jacket 27 which cools the internal combustion cylinders 22 and communicates with the hot water jacket 28. The other source is hot water entering the hot water jacket 28 through the conduit 108 from the heat exchangers 107 in the exhaust flue manifold stacks 106.

The primary purpose of the Stirling-type engines 25 is to improve the overall efficiency of the engine system 20 by utilizing the wasted heat energy from the internal combustion cylinders 22.

FIG. 16 merely discloses a table illustrating one arrangement for the firing order of the cylinders, and showing the relative positions of the displacement cranks on the fast and slow sides of the cylinders and the relative position of the engine piston for each cylinder.

As illustrated in FIG. 1, no attempt has been made to disclose the connection of the hydraulic circuits for all the cylinders with their respective displacement pistons and crank mechanisms, for the sake of clarity.

Furthermore, the arrangement of eight internal combustion cylinders 22 and four Stirling-type engines 25 is merely illustrative of the invention. It is well within the scope of the invention to have a system with a single internal combustion cylinder 22 having either dual counter-pistons or a single engine piston. For example, as viewed in FIGS. 10-13, a single piston 35 could operate the single hydraulic circuit 42, including only the displacement pistons 46 and 60, for driving a single crank and a single rotary output shaft, with or without one or more Stirling-type engines 25.

Referring now to FIGS. 17-24, a modified engine system 170 is disclosed, including a vertical bank 171 of eight internal combustion engine cylinders identical to the bank 21 in FIG. 1, and a vertical bank of Stirling-type engines 172, similar to the bank 24 of FIG. 1.

Power developed by the internal combustion engines 171 and the Stirling-type engines 172 is also transmitted by hydraulic fluid through a plurality of hydraulic lines to pistons, which are in turn linked by crank mechanisms to transmission shafts of high and low speeds coupled through gears to an output shaft. However, the main advantage of the system 170 over the system 20 is that more hydraulic lines are coupled to fewer pistons in order to reduce the total number of crank mechanisms.

Figure 17:
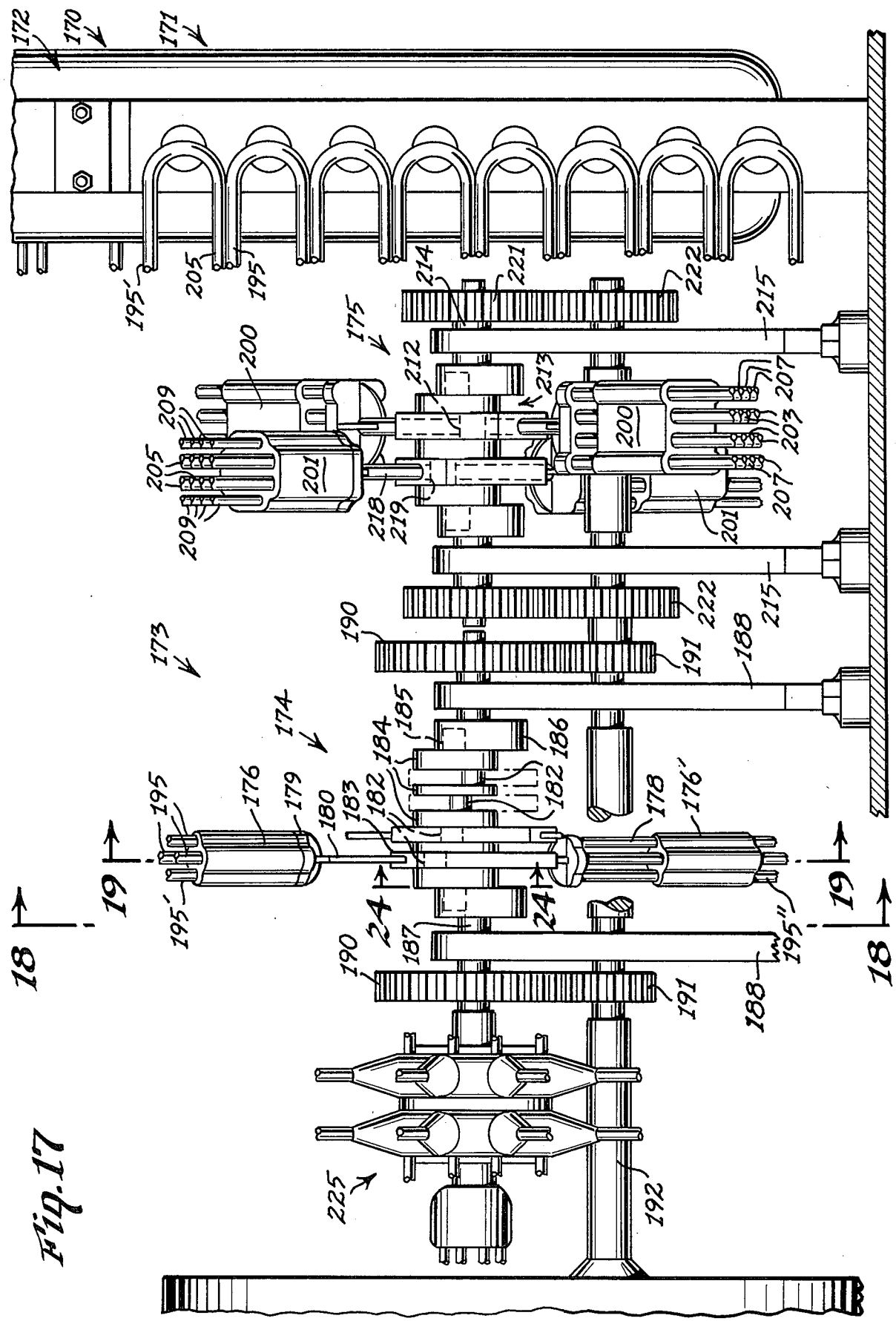
FIG. 17 is a fragmentary end elevation of the internal combustion engine cylinders and Stirling engine system in combination with a modified form of power transmission mechanism disclosed in side elevation.

The power transmission system 173 is divided into a slow section 174 and a fast section 175 (FIG. 17). The slow section 174 includes eight slow cylinder blocks 176 arranged in diametrically opposed pairs of blocks 176, as best disclosed in FIGS. 17 and 19. Each slow cylinder block 176 includes four hydraulic cylinders 177 arranged as best disclosed in FIG. 20. Adapted to reciprocate within each cylinder 177 is a corresponding piston 178, as best disclosed in FIG. 19. The reciprocal pistons 178 are ganged by fixing their outer ends in a head or cap 179, which in turn is connected to a piston rod 180. Opposed piston rods 180 are in turn connected to a crank pin carrier 181 in which is journaled a crank pin 182. The carrier 181 is adapted to reciprocate within the track 183. The crank pin 182 is in turn mounted eccentrically between a pair of rotary crank discs 184. As best disclosed in FIGS. 17 and 24, there are four crank pins 182 spaced longitudinally and also spaced circumferentially at equal rotary angles.

Figure 18:
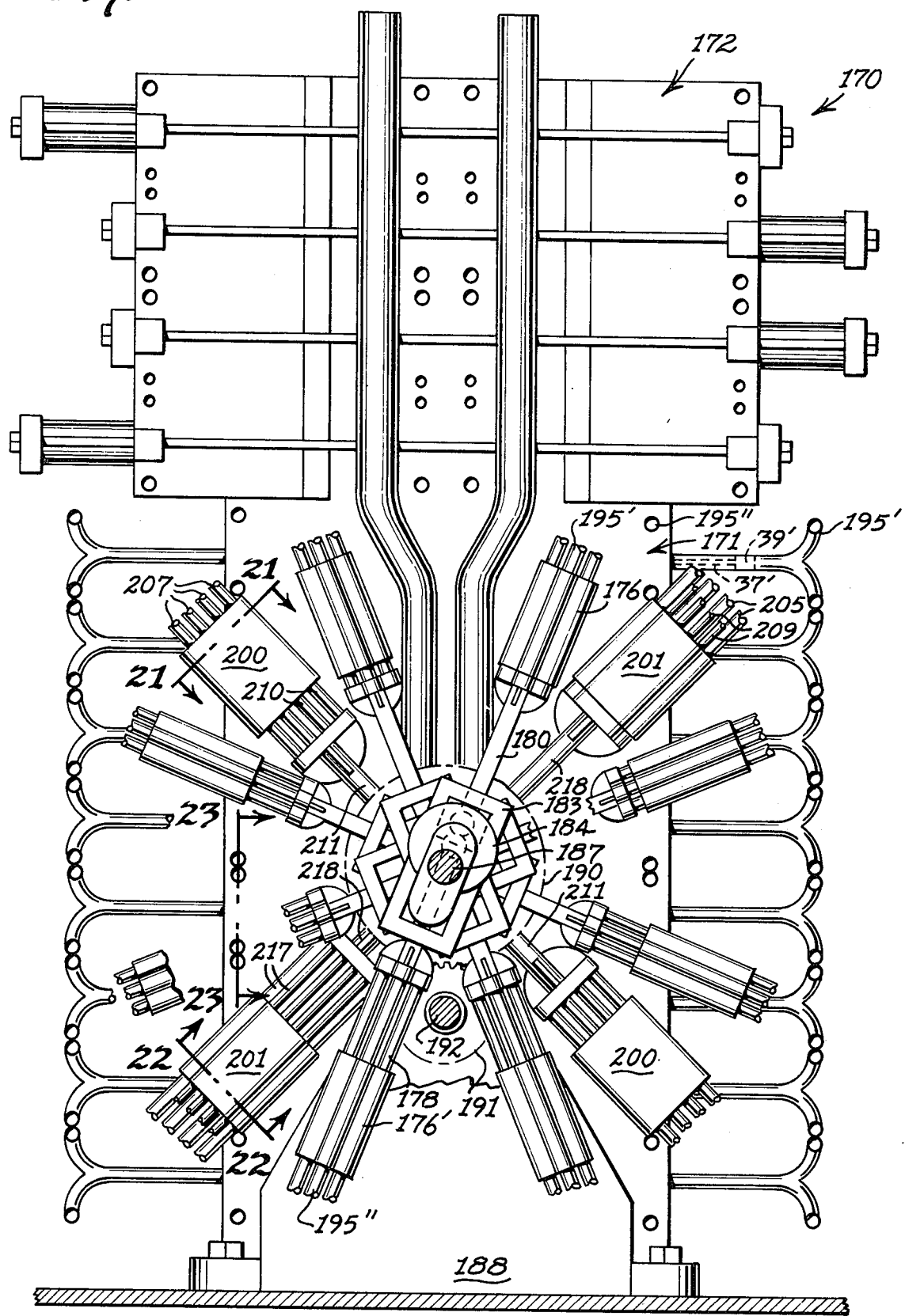
FIG. 18 is an enlarged section taken along the line 18—18 of FIG. 17, with portions broken away.
Figure 20:
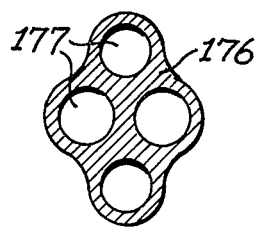
FIG. 20 is a section taken along the line 20—20 of FIG. 19.

As best disclosed in FIG. 18, the eight slow cylinder blocks 176 are arranged at 45° to each other, with diametrical pairs of the slow cylinder blocks 176 being arranged in longitudinally spaced radial planes, each pair of slow cylinder blocks 176 being in the same radial plane as one of the crank pins 182.

The end crank discs 184 are provided with stub shafts 185 journaled eccentrically in a counter-weighted end disc 186. Each end disc 186 is concentrically fixed to the slow transmission shaft sections 187 journaled in standards 188. One end section of the slow transmission shaft 187 is fixed to a large gear 190, which in turn is meshed with a smaller gear 191, preferably one-half the diameter of the larger gear 190, which in turn is fixed to the output shaft 192.

The radially outer end of each of the slow cylinder blocks 176 is provided with a plurality of hydraulic flexible tubes or lines 195, each of which communicates with a cylinder 177. The opposite ends of the lines 195 are connected to the slow sides of the various internal combustion engines in the bank 171.

Figure 23:
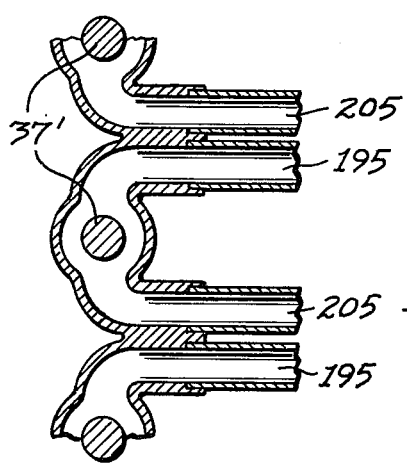
FIG. 23 is an enlarged fragmentary section taken along the line 23—23 of FIG. 18.
Figure 19:
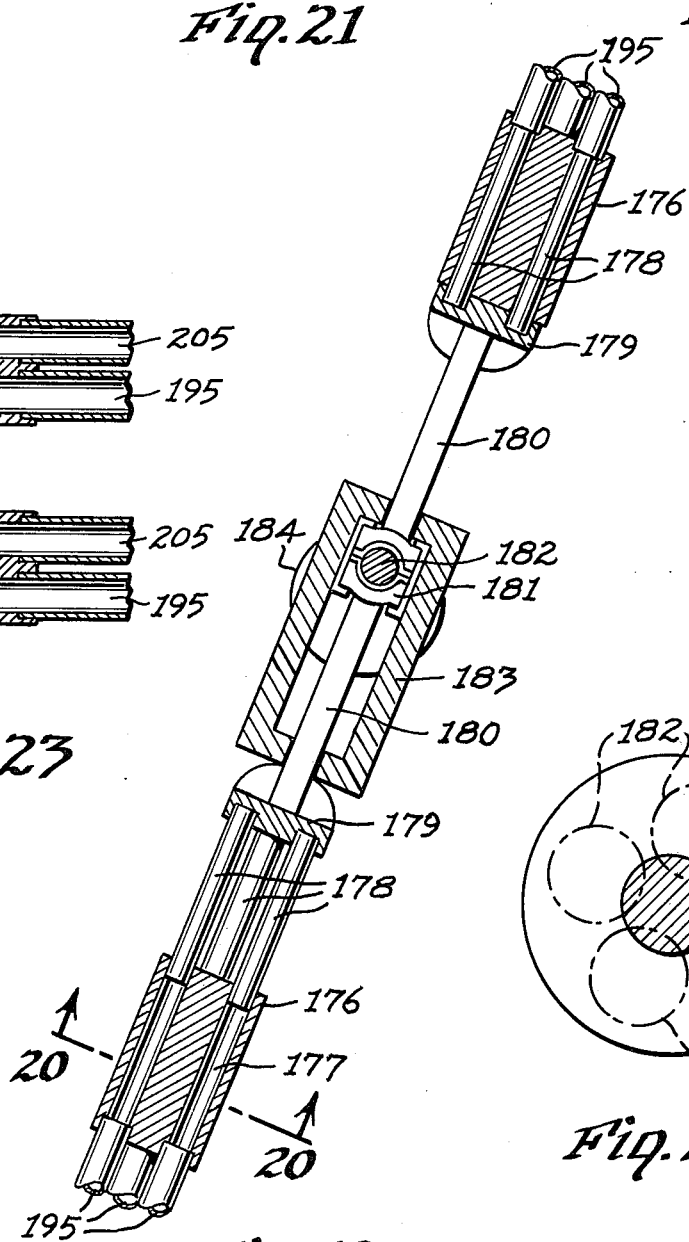
FIG. 19 is an enlarged fragmentary section taken along the line 19—19 of FIG. 17.
Figure 24:
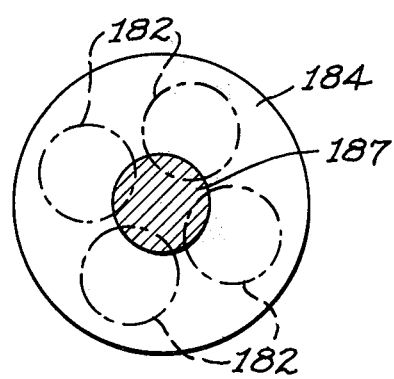
FIG. 24 is an enlarged section taken along the line 24—24 of FIG. 17.

In FIG. 10, one line 43 goes to one side of the piston 46 and the line 43' goes to the other side of the slow piston 46 from the same cylinder 20. In FIG. 18, hydraulic line 195' corresponding to line 43, connects the end of one internal combustion engine on the remote side of ram 37' with one of the cylinder blocks 176, while the fluid conduit 195" corresponding to line 43', connects the cylinder of the same engine on the other side of the ram 37' to the cylinder block 176' diametrically opposite and in the same radial plane, as best disclosed in FIGS. 17 and 18. FIG. 23 illustrates one possible arrangement of the lines 195 and 205 circulating fluid around the piston rod 37', and projecting from one side of the internal combustion engine cylinders in bank 171.

In the fast section 175, there are two pairs of fast cylinders blocks 200 and 201. Although there are fewer (four) cylinder blocks 200 and 201, each block 200 and 201 contains more hydraulic cylinders and pistons.

The fast cylinder blocks 200 and 201 function in the same manner as the slow cylinder blocks 176. Each cylinder block 200 and 201 has a plurality of hydraulic fluid cylinders, each of which communicates through a hydraulic fluid line to the fast side of an internal combustion engine or to the various fluid conduit connections in the cylinders of the Stirling engines.

Figure 21:
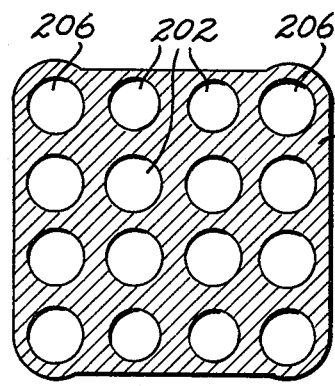
FIG. 21 is an enlarged section taken along the line 21—21 of FIG. 18.
Figure 22:
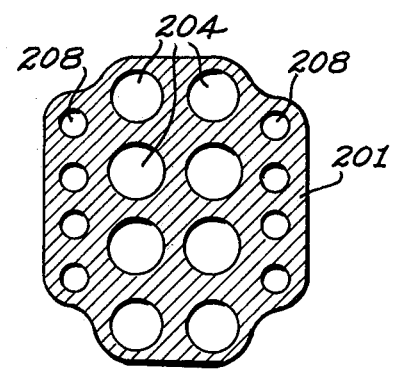
FIG. 22 is an enlarged section taken along the line 22—22 of FIG. 18.

As best illustrated in FIGS. 17 and 21, the eight cylinders 202 in the middle of the fast block 200, are all connected through conduits 203 to the fast sides of internal combustion engines in the bank 171. Furthermore, all of the eight hydraulic fluid cylinders 204 in the middle of the block 201, as best disclosed in FIGS. 17 and 22, are also connected through fluid lines 205 to the fast sides of the other internal combustion engines.

The four large cylinders 206 (FIG. 21) in each side of the fast cylinder blocks 200 are the displacement cylinders connected to the four Stirling engines in the bank 172 through fluid lines 207.

The four smaller cylinders 208 (FIG. 22) in each side of the fast cylinder blocks 201 are the hydraulic power cylinders connected to the same Stirling engines in the bank 172 through the hydraulic lines 209.

Reciprocating within each of the cylinders 202 and 206 of the block 200 are pistons 210, which in turn are connected to piston rod 211. Opposed piston rods 211 are connected to a crank pin 212, which in turn is journaled in a crank mechanism 213 similar to the crank mechanism in the slow section 174, for driving the fast transmission shaft sections 214 rotatably journaled within standards 215.

In a similar manner, pistons 217 are adapted to reciprocate within the corresponding cylinders 208 and 204 in the cylinder block 201. The pistons 217 are connected to opposed piston rods 218, which in turn are connected to a crank pin 219 connected in the fast crank mechanism 213. The crank pin 219 is located in the crank mechanism 213, 180° from the crank pin 212. A section of the fast transmission shaft 214 is connected through gears 221 and 222 to drive the output shaft 192.

A distributor mechanism 225 (FIG. 17) is adapted to open and close sleeve valves, such as the sleeve valves 76 and 93, in a similar manner as the cams 88 and 103 disclosed in FIG. 10.

Thus, the engine system 170 is provided with a more simplified transmission system 173, at least insofar as the number of crank mechanism employed.

What is claimed is:

1. An internal combustion engine system comprising:
   a. combustion cylinder means having intake and exhaust means,
   b. an engine piston reciprocable in said cylinder means, and having intake, compression, power and exhaust strokes,
   c. power output means,
   d. link means connecting said piston and said power output means whereby said power stroke is substantially greater than said intake stroke,
   e. said link means comprising hydraulic circuit means having a ram passage, first branch circuit means communicating with said ram passage, and second branch circuit means communicating with said ram passage, f. a ram operatively connected to said engine piston and reciprocably movable in said ram passage, g. a slow displacement piston movable in said first branch circuit means, h. a fast displacement piston movable in said second branch circuit means, and i. transmission means operatively connecting said displacement pistons and said power output means causing said fast displacement piston to move in said second branch circuit means at a speed faster than said slow displacement piston moves in said first branch circuit means.

2. The invention according to claim 1 in which said transmission means comprises first crank means connecting said slow displacement piston to said output means, second crank means connecting said fast displacement piston to said output means, said output means comprising reduction gear means connected to said first crank means.

3. The invention according to claim 1 in which said first branch circuit means comprises a first branch line connecting opposite ends of said ram passage to form a first loop, and said second branch circuit means comprising a second branch line connecting opposite ends of said ram passage to form a second loop, said slow displacement piston being movable in said first branch line and said fast displacement piston being movable in said second branch line, said hydraulic circuit means comprising hydraulic fluid in said ram passage and said branch lines for transmitting motion between said ram and said displacement pistons.

4. The invention according to claim 1 in which said intake means comprises an intake port in said cylinder means, intake sleeve valve means reciprocal of said cylinder between positions opening and closing said intake port, actuator means operatively connected to said intake sleeve valve means for opening and closing said intake port in timed relationship with the strokes of said engine piston.

5. The invention according to claim 4 in which said actuator means comprises fluid control means for positively driving said intake sleeve valve means reciprocably toward said open and closed positions of said intake sleeve valve means, fluid valve means for controlling the direction of flow of said fluid in said fluid control means, and rotary cam means operative to actuate said fluid valve means.

6. The invention according to claim 1 in which said exhaust means comprises an exhaust port in said cylinder, exhaust sleeve valve means reciprocal of said cylinder between positions opening and closing said exhaust port, actuator means operatively connected to said exhaust sleeve valve means for opening and closing said exhaust valve in timed relationship with the strokes of said engine piston.

7. The invention according to claim 6 in which said actuator means comprises fluid control means for positively driving said exhaust sleeve valve means reciprocably toward said open and closed positions of said exhaust sleeve valve means, fluid valve means for controlling the direction of flow of said fluid in said fluid control means, and rotary cam means operative to actuate said fluid valve means.

8. The invention according to claim 1 further comprising a second engine piston within said combustion cylinder means operative to reciprocate in said opposite directions from said first engine piston, said reciprocable engine pistons forming a combustion chamber therebetween, said hydraulic circuit means comprising first hydraulic circuit means and second hydraulic circuit means identical to said first hydraulic circuit means, including a second ram passage and third and fourth circuit means, a second ram operatively connected to said second engine piston and reciprocably movable in said second ram passage, a second slow displacement piston movable in said third branch circuit means, a second fast displacement piston movable in said fourth branch circuit means, and second transmission means operatively connecting said second displacement piston and said power output means, causing said second fast displacement piston to move in said fourth branch circuit means at a speed faster than said second slow displacement piston moves in said third branch circuit means and at the same corresponding speeds as said respective first displacement pistons.

9. The invention according to claim 8 in which said transmission means comprises fast shaft means for operatively linking said fast displacement pistons together and slow shaft means for linking said slow displacement pistons together, and speed accelerator means coupling said slow shaft means to said power output means.

10. The invention according to claim 1 in which said combustion cylinder means comprises heat exchanger means for removing heat from said combustion cylinder means, a Stirling-type engine having hot and cold compartments separated by regenerator means, a hot piston reciprocal within said hot chamber and a cold piston reciprocal within said cold chamber, second heat exchanger means in communication with said hot cylinder, and fluid transfer means coupling said first and second heat exchanger means for transferring heat from said combustion cylinder means to said hot compartment, power transmission means operatively connected to said Stirling-type engine and means operatively connecting said power transmission means of said Stirling-type engine to said power output means.

11. The invention according to claim 10 in which said power transmission means comprises a power hydraulic circuit connecting said cold chamber and said hot chamber, a power piston reciprocably mounted within said power circuit, a displacement hydraulic circuit operatively connecting said cold chamber and said hot chamber, and a displacement piston reciprocably movable within said displacement circuit, and link means operatively connecting said power piston and said displacement piston to said output means.

12. The invention according to claim 11 in which said transmission means comprises crank means operatively connecting said power piston and said displacement piston for relatively timed movement and for transmitting power developed by said power cylinder to said output means.

13. The invention according to claim 1 in which said transmission means comprises timing means controlling the relative speeds of said displacement pistons and the relative length of said intake and power strokes.

14. The invention according to claim 13 in which the ratio of the speeds of said fast and slow displacement pistons is approximately two to one.

15. The invention according to claim 14 in which both said displacement pistons travel in the same fluid direction as said ram travels during the power stroke of said engine piston.

16. The invention according to claim 15 in which said ram has a ram face on the opposite end of the ram from said engine piston, both said displacement pistons traveling away from said ram face during said power stroke and both said displacement pistons traveling toward said ram face during said exhaust stroke.

* * * * *